United States Patent
Zhang et al.

(10) Patent No.: US 9,503,719 B2
(45) Date of Patent: Nov. 22, 2016

(54) INTER-LAYER CODING UNIT QUADTREE PATTERN PREDICTION

(75) Inventors: Wenhao Zhang, Beijing (CN); Yi-Jen Chiu, San Jose, CA (US); Lidong Xu, Beijing (CN); Yu Han, Beijing (CN); Hong Jiang, El Dorado Hills, CA (US)

(73) Assignee: INTEL CORPORATION, Santa Clara, CA (US)

( * ) Notice: Subject to any disclaimer, the term of this patent is extended or adjusted under 35 U.S.C. 154(b) by 464 days.

(21) Appl. No.: 13/977,563

(22) PCT Filed: Jun. 26, 2012

(86) PCT No.: PCT/CN2012/077540
§ 371 (c)(1),
(2), (4) Date: Sep. 17, 2013

(87) PCT Pub. No.: WO2014/000160
PCT Pub. Date: Jan. 3, 2014

(65) Prior Publication Data
US 2014/0185669 A1   Jul. 3, 2014

(51) Int. Cl.
| H04N 7/12 | (2006.01) |
| H04N 11/02 | (2006.01) |
| H04N 11/04 | (2006.01) |
| H04N 19/503 | (2014.01) |
| H04N 19/30 | (2014.01) |
| H04N 19/96 | (2014.01) |
| H04N 19/33 | (2014.01) |
| H04N 19/59 | (2014.01) |

(52) U.S. Cl.
CPC ........ *H04N 19/00575* (2013.01); *H04N 19/30* (2014.11); *H04N 19/33* (2014.11); *H04N 19/503* (2014.11); *H04N 19/59* (2014.11); *H04N 19/96* (2014.11)

(58) Field of Classification Search
None
See application file for complete search history.

(56) References Cited

U.S. PATENT DOCUMENTS

| 6,078,619 A * | 6/2000 | Monro | H04N 19/503 375/240 |
| 7,792,188 B2 * | 9/2010 | Tong | H04N 19/00 375/240 |
| 2013/0003857 A1 * | 1/2013 | Yu | H04N 19/176 375/240.18 |

(Continued)

FOREIGN PATENT DOCUMENTS

| CN | 101222641 A | 7/2008 |
| CN | 102447907 A | 5/2012 |
| WO | 2014/000160 A1 | 1/2014 |

OTHER PUBLICATIONS

International Search Report and Written Opinion received for PCT Patent Application No. PCT/CN2012/077540, mailed on Apr. 4, 2013, 10 Pages.

(Continued)

*Primary Examiner* — Frederick Bailey
*Assistant Examiner* — Talha M Nawaz
(74) *Attorney, Agent, or Firm* — Lynch Law Patent Group, P.C.

(57) ABSTRACT

Systems, apparatus, articles, and methods are described including operations for inter-layer coding unit quadtree pattern prediction.

24 Claims, 9 Drawing Sheets

(56) References Cited

U.S. PATENT DOCUMENTS

| | | | |
|---|---|---|---|
| 2013/0064290 A1* | 3/2013 | Kung | H04N 7/00 375/240.03 |
| 2013/0106852 A1* | 5/2013 | Woodhouse | G06T 17/20 345/423 |
| 2013/0114675 A1* | 5/2013 | Guo | H04N 19/13 375/240.02 |
| 2013/0202035 A1* | 8/2013 | Chen | H04N 19/00781 375/240.12 |
| 2014/0003493 A1* | 1/2014 | Chen | H04N 19/597 375/240.02 |

OTHER PUBLICATIONS

Cai, et al., "Model of Next-generation Video Standard and Relative Key Video Engineering/Technologies", vol. 36, Issue 2, ISSN 1002-8692, Feb. 2012, pp. 80-83.

* cited by examiner

INTER-LAYER CODING UNIT QUADTREE PATTERN PREDICTION

BACKGROUND

A video encoder compresses video information so that more information can be sent over a given bandwidth. The compressed signal may then be transmitted to a receiver that decodes or decompresses the signal prior to display.

High Efficient Video Coding (HEVC) is a new video compression standard planned to be finalized by the end 2012. It is currently under development by the Joint Collaborative Team on Video Coding (JCT-VC) formed by ISO/IEC Moving Picture Experts Group (MPEG) and ITU-T Video Coding Experts Group (VCEG). Similar with previous video coding standards, HEVC consists of basic modules such as intra/inter prediction, transform, quantization and in-loop filtering and entropy coding. The team will also standardize a Scalable Video Coding (SVC) extension of HEVC standard.

As the standardization of the main part of HEVC is reaching completion. JCT-VC has started planning to add a Scalable Video Coding (SVC) extension into HEVC standard. SVC is an important issue to cope with the heterogeneity of networks and devices in modern video service environment. A SVC bit stream contains several subset bit streams that can themselves be decoded, and these sub streams represent the source video content with different resolution, frame rate, quality, bit depth, and etc. The scalabilities are achieved by using a multi-layer coding structure. In general, there's one Base Layer and several Enhancement Layers in a SVC system.

HEVC defines Coding Units (CUs), which are used to sub-partition a picture into rectangular blocks with variable size. The Largest coding unit (LCU) can be a 128×128 block, a 64×64 block, a 32×32 block or a 16×16 block. A LCU can be encoded directly or be divided into 4 Coding Unit (CU) for next level encoding. For a CU in one level, it can be encoded directly or be further divided into next level for encoding. The smallest CU is 8×8. Within each LCU, a quadtree based splitting scheme may be used to specify the coding unit partition pattern.

In addition, Prediction Units (PUs) and Transform Units (TUs) are also defined by HEVC to specify how to divide a coding unit to do the prediction and transform, respectively. The PU segmentation depends on the coding unit coding mode. When intra coded, a coding unit with size equal to 2N×2N can be predicted in one 2N×2N PU or in four N×N PUs. When inter coded, a 2N×2N coding unit can be predicted in one 2N×2N PU, or two 2N×N PUs, or two N×2N PUs, or one 0.5N×2N PU and one 1.5N×2N PU, or one 1.5N×2N PU and one 0.5N×2N PU, or one 2N×0.5N PU and one 2N×1.5N PU, or one 2N×1.5N PU and one 2N×0.5N PU, or four N×N PUs. The TU partition may also quadtree splitting based.

For example, a series of block transform cores are defined in HEVC, which can be categorized as Square Quad-tree Transform (SQT) and Non-Square Quad-tree Transform (NSQT). SQT may be performed with sizes of 32×32, 16×16, 8×8 and 4×4. NSQT may be performed with sizes of 32×8, 8×32, 16×4 and 4×16. After the intra or inter prediction, such transforms may apply to the residual blocks to generate coefficients. After that, the coefficients are quantized, scanned into one-dimensional order and finally CABAC coded.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
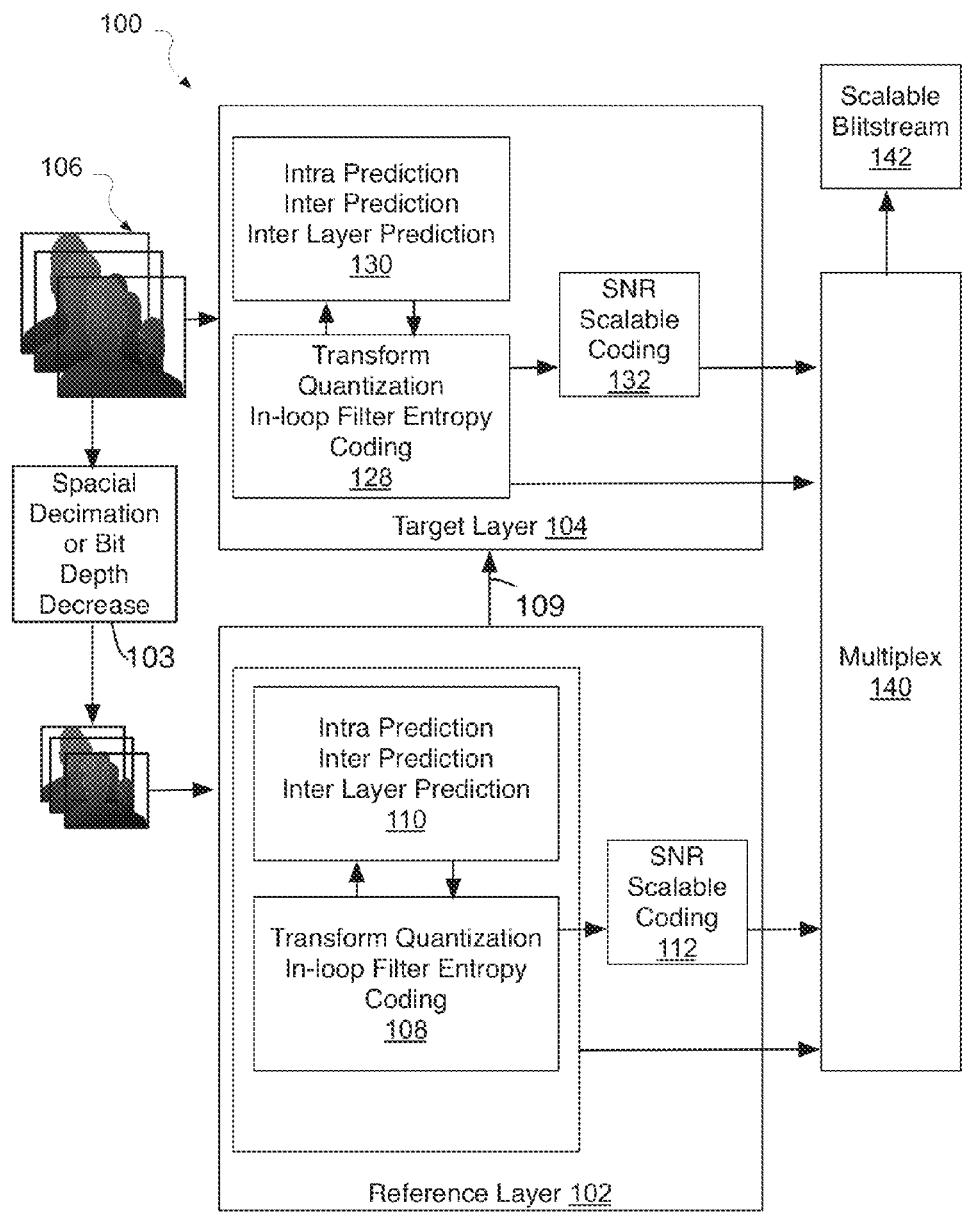
FIG. 1 is an illustrative diagram of an example video coding system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, apparatus, articles, and methods are described below including operations for inter-layer coding unit quadtree pattern prediction.

As described above, in scalable video coding, a base layer may be encoded at first, and then enhancement layers may be encoded. In some examples, a series of block transform cores may be categorized as Square Quad-tree Transform (SQT) and Non-Square Quad-tree Transform (NSQT). SQT may be performed with block sizes of 32×32, 16×16, 8×8 and 4×4. NSQT may be performed with block sizes of 32×8, 8×32, 16×4 and 4×16. After the intra or inter prediction, such transforms may apply to the residual blocks to generate coefficients. After that, the coefficients may be quantized, scanned into one-dimensional order and finally CABAC coded.

As will be described in greater detail below, operations for inter-layer coding unit quadtree pattern prediction may be applied to the problem of video compression, and may be considered as a potential technology to be standardized in the international video codec committees. In scalable video coding systems, multi-layer coding may be used to provide support for several kinds of scalabilities, e.g. spatial scalability, temporal scalability, quality scalability, bit-depth scalability, etc. In order to achieve higher compression performance, various inter-layer prediction technologies may be exploited to remove the redundancy between different layers. In some cases, some block-based video coding designs may use more a complex coding unit pattern, e.g., the quadtree-based partition scheme in HEVC. As a result, the coding unit pattern information becomes an important portion of a video bit stream. Because different scalable coding layers have highly related coding unit pattern, an inter-layer coding unit quadtree pattern prediction technology may be useful. For example, the coding unit pattern information from a lower reference layer can be used by a higher target layer. Furthermore, this inter-layer coding unit quadtree pattern prediction can also be adjusted and updated at the higher target layer to allow a wider range of usage. Therefore, such inter-layer coding unit quadtree pattern prediction techniques may improve the coding efficiency and flexibility of scalable video codec design.

FIG. 1 is an illustrative diagram of an example video coding system 100, arranged in accordance with at least some implementations of the present disclosure. In some examples, video coding system 100 may include additional items that have not been shown in FIG. 1 for the sake of clarity. For example, video coding system 100 may include a processor, a radio frequency-type (RF) transceiver, a display, and/or an antenna. Further, video coding system 100 may include additional items such as a speaker, a microphone, an accelerometer, memory, a router, network interface logic, etc. that have not been shown in FIG. 1 for the sake of clarity.

As used herein, the term "coder" may refer to an encoder and/or a decoder. Similarly, as used herein, the term "coding" may refer to encoding via an encoder and/or decoding via a decoder. For example a video encoder and video decoder may both be examples of coders capable of coding.

As illustrated, video coding system 100 may include an SVC encoder with one reference layer 102 (e.g., a base layer or a lower enhancement layer) and one target layer 104 (e.g., an enhancement layer). For example, two layers (e.g., lower reference layer 102 and target layer 104) are illustrated; however, any number of enhancement layers may be utilized in addition to a base layer. The base layer may be encoded in a manner that is compatible with the HEVC standard, and may be identified as layer 0. Enhancement layers may be identified as layers 1, 2, etc. When coding a target layer 104 with a layer identification equal to N, all the layers with layer identification less than N may be available. In such a situation, the picture belonging to target layer 104 can be predicted from a picture from one lower reference layer 102 or previously coded pictures in the same layer. Inter-layer prediction, which reuses coding information from reference layer 102, is one of the key features to ensure the compression efficiency of a SVC codec design.

Similarly, during the operation of video coding system 100 on reference layer 102, current video information may be provided to a spatial decimation or bit depth decrease module 103 in the form of a frame of video data 106. The current video frame may be split into Largest Coding Units (LCUs) and then passed to a transform quantization in-loop filter entropy coding module 108. Transform quantization in-loop filter entropy coding module 108 may perform known video transform and quantization processes, may perform known entropy coding processes, and may perform known de-quantization and inverse transform processes to implement the inverse of the transform and quantization operations. An intra prediction and inter prediction module 110 may perform intra-frame prediction and inter-frame prediction operations. An SNR (signal to noise ratio) scalable coding module 112 may perform scalable coding on the output from transform quantization in-loop filter entropy coding module 108 and intra prediction and inter prediction module 110.

Similar operations may be performed for target layer 104 via a transform quantization in-loop filter entropy coding module 128, an intra prediction and inter prediction module 130, and/or an SNR scalable coding module 132.

A multiplex module 140 may receive output from transform quantization in-loop filter entropy coding module 108 of reference layer 102, SNR scalable coding module 112 of reference layer 102, transform quantization in-loop filter entropy coding module 128 of target layer 104, and/or SNR scalable coding module 132 of target layer 104, which all may be mixed for transmission as a scalable bitstream 142.

In operation, video coding system 100 may implement operations for video coding including inter-layer coding unit quadtree pattern prediction. For example, when coding a coding unit of target layer 104, a co-located coding unit can be found in the reference layer 102 for use in such prediction. As will be described in greater detail below, quadtree pattern information of the current coding unit can be predicted from the co-located reference layer 102 coding unit.

As will be discussed in greater detail below, video coding system 100 may be used to perform some or all of the various functions discussed below in connection with FIGS. 2 and/or 3.

Figure 2:
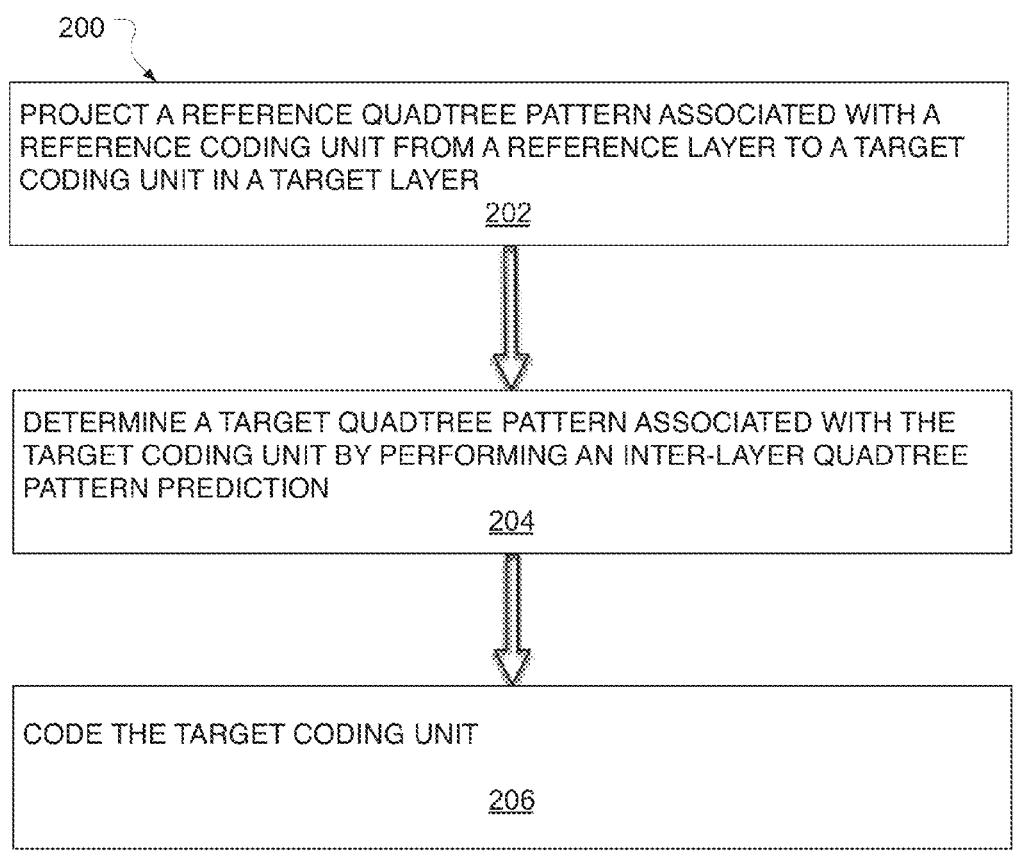
FIG. 2 is a flow chart illustrating an example video coding process.

FIG. 2 is a flow chart illustrating an example video coding process 200, arranged in accordance with at least some implementations of the present disclosure. In the illustrated implementation, process 200 may include one or more operations, functions or actions as illustrated by one or more of blocks 202, 204, and/or 206. By way of non-limiting example, process 200 will be described herein with reference to example video coding system 100 of FIGS. 1 and/or 7.

Process 200 may be utilized as a computer-implemented method for content aware selective adjusting of motion estimation. Process 200 may begin at block 202, "PROJECT A REFERENCE QUADTREE PATTERN ASSOCIATED WITH A REFERENCE CODING UNIT FROM A REFERENCE LAYER TO A TARGET CODING UNIT IN A TARGET LAYER", where a reference quadtree pattern associated with a reference coding unit from a reference layer may be projected to a target coding unit in a target layer. For example, the reference quadtree pattern associated with a portion of the reference coding unit from the reference layer may be projected to the target coding unit in the target layer based at least in part on the resolution of the target coding unit.

In some examples, the reference quadtree pattern associated with a reference coding unit may include the CU splitting information, PU splitting information and/or TU splitting information. For example, the target coding unit in the target layer may be predicted from the reference CU quadtree pattern associated with a portion of the reference coding unit from the reference layer, from the reference CU and PU combined quadtree pattern associated with a portion of the reference coding unit from the reference layer, from the reference CU and TU combined splitting quadtree pattern associated with a portion of the reference coding unit from the reference layer, from the reference CU, PU and TU combined quadtree pattern associated with a portion of the reference coding unit from the reference layer, the like, or combinations thereof.

In cases where the reference layer includes a base layer, the target layer may include an enhancement layer: alternatively, in cases where the reference layer includes an enhancement layer, the target layer may include a higher enhancement layer.

Processing may continue from operation 202 to operation 204, "DETERMINE A TARGET QUADTREE PATTERN ASSOCIATED WITH THE TARGET CODING UNIT BY PERFORMING AN INTER-LAYER QUADTREE PATTERN PREDICTION", where a target quadtree pattern associated with the target coding unit may be determined by performing an inter-layer quadtree pattern prediction. For example, the target quadtree pattern associated with the target coding unit may be determined by performing an inter-layer quadtree pattern prediction based at least in part on the projected reference quadtree pattern.

Processing may continue from operation 204 to operation 206, "CODE THE TARGET CODING UNIT", where the target unit may be coded. For example, the target unit may be coded based at least in part on the determined target quadtree pattern.

Some additional and/or alternative details related to process 200 may be illustrated in one or more examples of implementations discussed in greater detail below with regard to FIG. 3.

Figure 3:
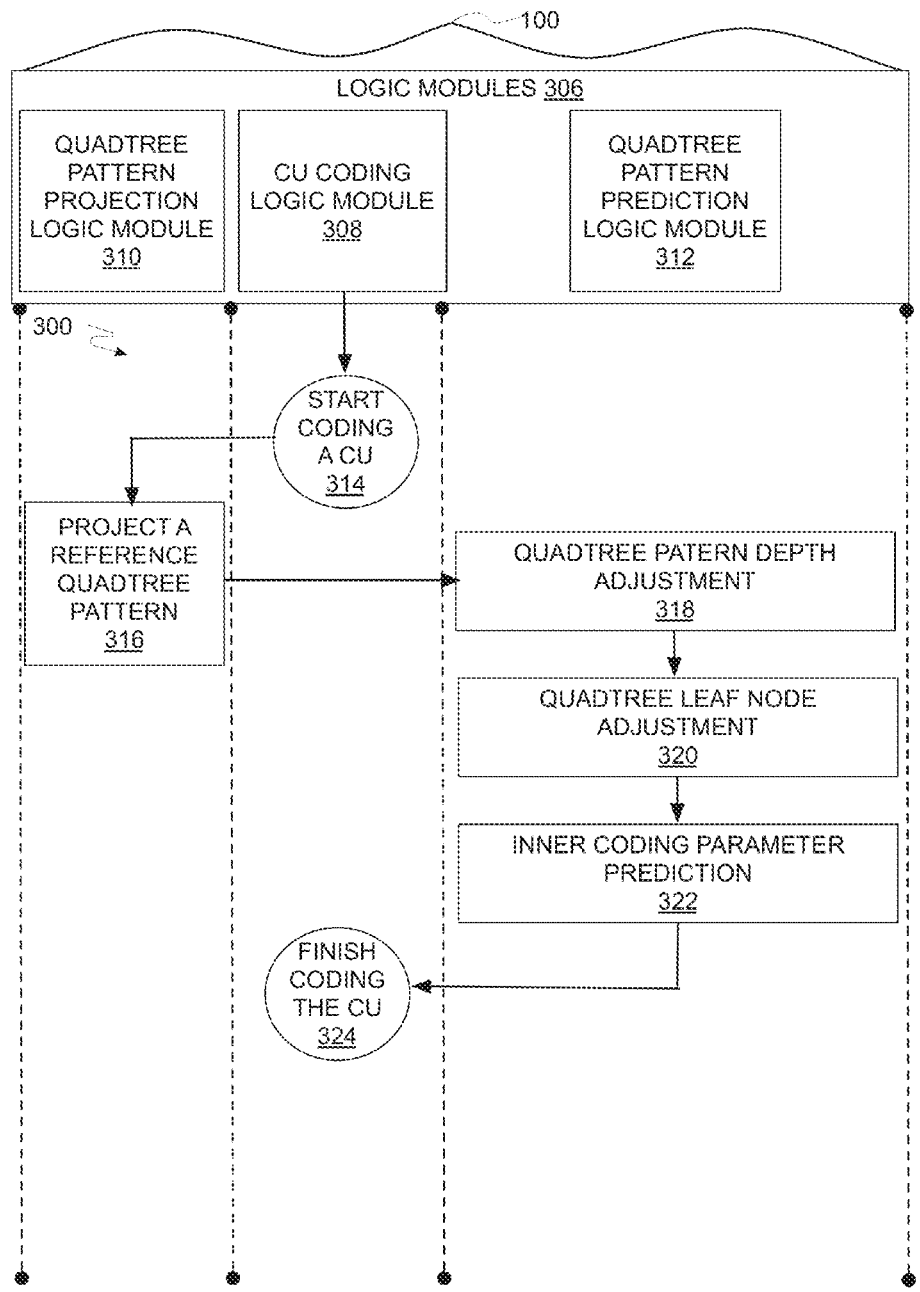
FIG. 3 is an illustrative diagram of an example video coding process in operation.

FIG. 3 is an illustrative diagram of example video coding system 100 and video coding process 300 in operation, arranged in accordance with at least some implementations of the present disclosure. In the illustrated implementation, process 300 may include one or more operations, functions or actions as illustrated by one or more of actions 314, 316, 318, 320, 322, and/or 324. By way of non-limiting example, process 300 will be described herein with reference to example video coding system 100 of FIGS. 1 and/or 7.

In the illustrated implementation, video coding system 100 may include logic modules 306, the like, and/or combinations thereof. For example, logic modules 306, may include cu coding logic module 308, quadtree pattern projection logic module 310, quadtree pattern prediction logic module 312, the like, and/or combinations thereof. Although video coding system 100, as shown in FIG. 3, may include one particular set of blocks or actions associated with particular modules, these blocks or actions may be associated with different modules than the particular module illustrated here.

Process 300 may begin at block 314, "START DECODING A CU", where coding may be started. For example, a coding unit may be decoded. Although process 300, as illustrated, is directed to decoding, the concepts and/or operations described may be applied in the same or similar manner to coding in general, including in encoding.

Processing may continue from operation 314 to operation 316, "PROJECT A REFERENCE QUADTREE PATTERN", where a reference quadtree pattern may be projected. For example, the reference quadtree pattern associated with a portion of the reference coding unit from the reference layer may be projected to the target coding unit in the target layer based at least in part on the resolution of the target coding unit.

In cases where the reference layer includes a base layer, the target layer may include an enhancement layer; alternatively, in cases where the reference layer includes an enhancement layer, the target layer may include a higher enhancement layer.

Processing may continue from operation 316 to operation 318, operation 320, or proceed to both operations 318 and 320. As will be described in greater detail below, operations 318 and 320 may operate so that a target quadtree pattern associated with the target coding unit may be determined by performing an inter-layer quadtree pattern prediction. For example, the target quadtree pattern associated with the target coding unit may be determined by performing an inter-layer quadtree pattern prediction based at least in part on the projected reference quadtree pattern.

Processing may continue from operation 316 to operation 318, "QUADTREE PATERN DEPTH ADJUSTMENT", where quadtree pattern depth adjustment may be performed. For example, quadtree pattern depth adjustment may be performed on the projected reference quadtree pattern to form a depth adjusted projected reference quadtree pattern.

In some examples, such depth adjustment may include adjusting a splitting pattern for all leaf nodes associated with the projected reference quadtree pattern based at least in part on a depth change parameter. For example, such depth adjustment may include merging all leaf nodes associated with the projected reference quadtree pattern into a previous depth level when the depth change parameter indicates a coarser resolution, and/or splitting all leaf nodes associated with the projected reference quadtree pattern into a next depth level when the depth change parameter indicates a finer resolution.

Processing may continue from operation 318 or operation 316 to operation 320, "QUADTREE LEAF NODE ADJUSTMENT", where quadtree leaf node adjustment may be performed. For example, quadtree leaf node adjustment may be performed in addition or in the alternative to the quadtree pattern depth adjustment. Such quadtree leaf node adjustment may be performed on the projected reference quadtree pattern to form a leaf node adjusted projected reference quadtree pattern.

In some examples, such leaf node adjustment may include adjusting a splitting pattern for individual leaf nodes associated with the projected reference quadtree pattern on a leaf node-by-leaf node basis based at least in part on individual leaf node split flags associated with individual leaf nodes. For example, such leaf node adjustment may include merging individual leaf nodes associated with the projected reference quadtree pattern into a previous depth level when the individual leaf node split flags indicates a coarser resolution, and/or splitting individual leaf nodes associated with the projected reference quadtree pattern into a next depth level when the individual leaf node split flags indicates a finer resolution.

In some examples, a decoder portion of the coder may receive parameter values from an encoder portion of the coder. Such parameter values may be associated with performing quadtree pattern depth adjustment, performing quadtree leaf node adjustment and/or performing inner coding parameter prediction. In other examples, a decoder portion of the coder may determine parameter values independent from and in parallel with an encoder portion of the coder. For example, in order to ensure the decoder knows how to apply the inter-layer coding unit pattern prediction, some flags and parameters may be coded into the bit stream and transferred to the decoder via the encoder. A flag (e.g., an inter_layer_cu_pattern_prediction_flag) that specifies if the inter-layer coding unit pattern prediction is used for current target layer (e.g., an enhancement layer) coding unit or not may be coded into the bit stream and transferred to the decoder via the encoder. A parameter (e.g., delta_depth) that specifies how to adjust all the leaf nodes in the resulting coding unit quadtree splitting pattern may be coded into the bit stream and transferred to the decoder via the encoder. A flag (e.g. a leaf_nodes_updating_flag) that specifies if an updating process will be performed to the resulting coding unit pattern or not may be coded into the bit stream and transferred to the decoder via the encoder. A group of flags (e.g., a leaf_node_splitting_flag) that specify if each leaf node of the resulting coding unit quadtree will be further split or not may be coded into the bit stream and transferred to the decoder via the encoder.

Process may continue from operations 316, 318, and/or 320 to operation 322, "INNER CODING PARAMETER PREDICTION", where the coding parameters of reference coding unit may be reused to code target coding unit. For example, the coding parameters of reference coding unit (e.g., coding parameters such as prediction unit mode, motion parameters, transform unit pattern, the like, and/or combinations thereof of the reference coding unit) may be reused to code the target coding unit. In one example, the target coding unit may use the same prediction unit modes as the corresponding reference coding unit in the reference layer to code the target coding unit. Additionally or alternatively, the target coding unit may use the same motion vectors, reference list index, and/or other motion parameters as the corresponding reference coding unit in the reference layer to code the target coding unit. Additionally or alternatively, the target coding unit may use the transform unit splitting as the corresponding reference coding unit in the reference layer to code the target coding unit.

Processing may continue from operations 316, 318, 320 and/or 322 to operation 324, "FINISH CODING THE CU", where the target unit may be coded. For example, the target unit may be coded based at least in part on the determined target quadtree pattern.

In operation, processes 200 and 300, as illustrated in FIGS. 2 and 3, may operates so that the determination of the target quadtree pattern may be performed during scalable video coding. For example, the determination of the target quadtree pattern may be performed during one or more scalability types including spatial scaling, temporal scaling, quality scaling, bit-depth scaling the like, and/or combinations thereof. In operation, because the spatial resolution of a target layer (e.g., an enhancement layer) picture and a reference layer (e.g., a base layer or a lower level enhancement layer) picture may be different, the coding unit pattern should be scaled, which is processed in the quadtree pattern projection logic module 308. After that, quadtree pattern prediction logic module 312 may perform quadtree pattern depth adjustment to make the target layer (e.g., an enhancement layer) coding unit slitting to be finer or coarser. Additionally or alternatively, quadtree pattern prediction logic module 312 may further tune the resulting target layer (e.g., an enhancement layer) coding unit pattern quadtree updating. Additionally or alternatively, quadtree pattern prediction logic module 312 may further reuse the coding parameters of reference coding unit (e.g., PU mode, motion parameters, TU splitting, and etc.) to code the target coding unit.

In some examples, a differentiation may be made between a first type of coding unit and a second type of coding unit different from the first type. For example, the first and second type of coding units differ base on one or more of the following criteria: a slice-level criterion, a picture level criterion, a view level criterion, the like, and/or combinations thereof. In such examples, inter-layer quadtree pattern prediction may be selectively performed with a first parameter value for the first type of coding unit and with a second parameter value different from the first parameter value for the second type of coding unit. In some examples, a mechanism may be used to apply slice/picture level adaptive inter-layer coding unit pattern prediction. For example, inter-layer coding unit pattern prediction may be applied to a slice/picture or not applied to a slice/picture. In another example, inter-layer coding unit pattern prediction may apply different inter-layer coding unit pattern prediction parameters to different slices/pictures.

While implementation of example processes 200 and 300, as illustrated in FIGS. 2 and 3, may include the undertaking of all blocks shown in the order illustrated, the present disclosure is not limited in this regard and, in various examples, implementation of processes 200 and 300 may include the undertaking only a subset of the blocks shown and/or in a different order than illustrated.

In addition, any one or more of the blocks of FIGS. 2 and 3 may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 2 and 3 in response to instructions conveyed to the processor by a computer readable medium.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 4:
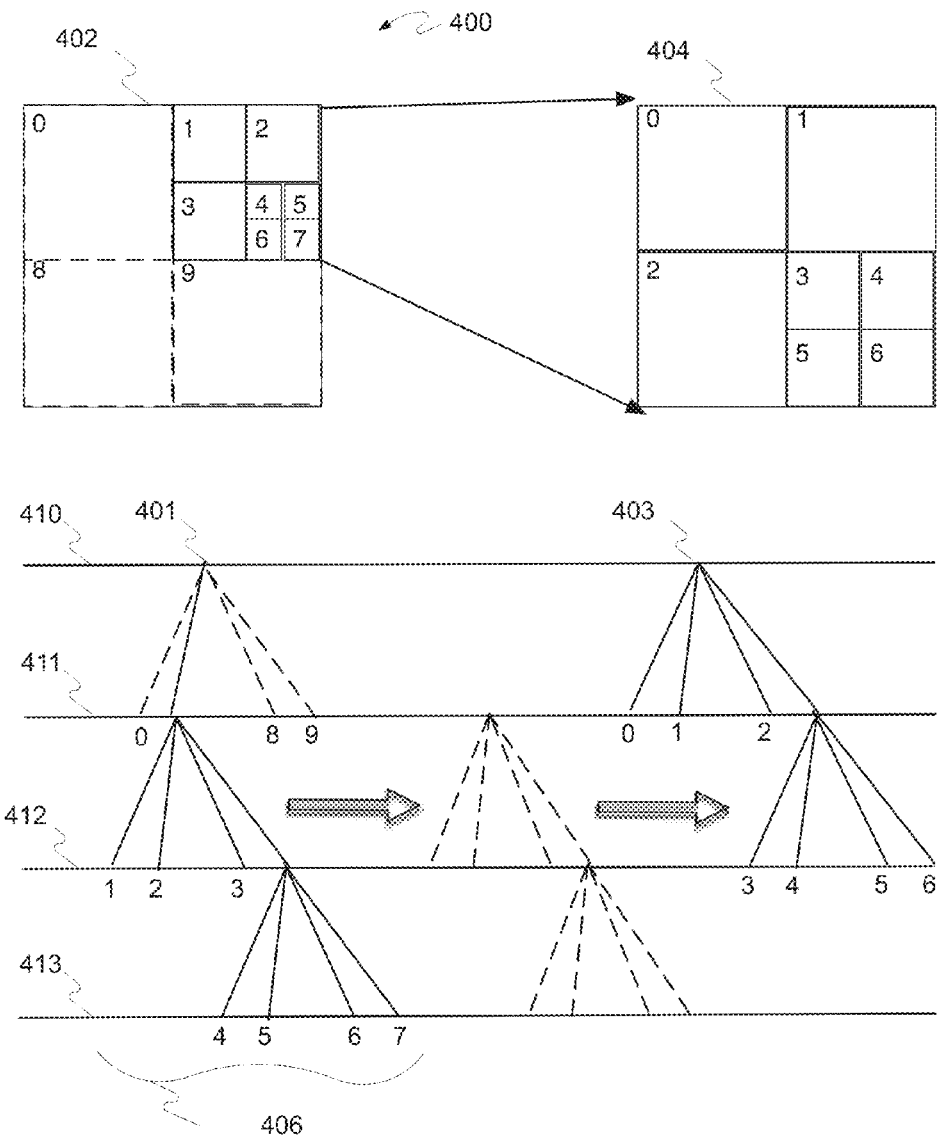
FIG. 4 is an illustrative diagram of example inter-layer coding unit quadtree pattern prediction scheme.

FIG. 4 is an illustrative diagram of example inter-layer coding unit quadtree pattern prediction scheme. In the illustrated implementation 400, a reference quadtree pattern 401 associated with a portion of the reference coding unit 402 from the reference layer may be projected as a projected reference quadtree pattern 403 onto to the target coding unit 404 in the target layer based at least in part on the resolution of the target coding unit 404.

As illustrated, reference quadtree pattern 401 and/or projected reference quadtree pattern 403 may have a plurality of leaf nodes 406 distributed among various depth levels. For example, a zero depth level 410, a primary depth level 411, a secondary depth level 412, and/or a tertiary depth level 413.

The resolution difference between the target coding unit 404 and the reference coding unit 402 impacts the projection. As illustrated, the target coding unit 404 has twice the horizontal resolution and twice the vertical resolution as compared to the reference coding unit 402, accordingly, the horizontal scale and the vertical scale of the reference coding unit 402 must be doubled to match the resolution of the target coding unit 404. However, this is only an example and other resolution/scale ratios may be subject to projection by the procedures described herein.

Figure 5:
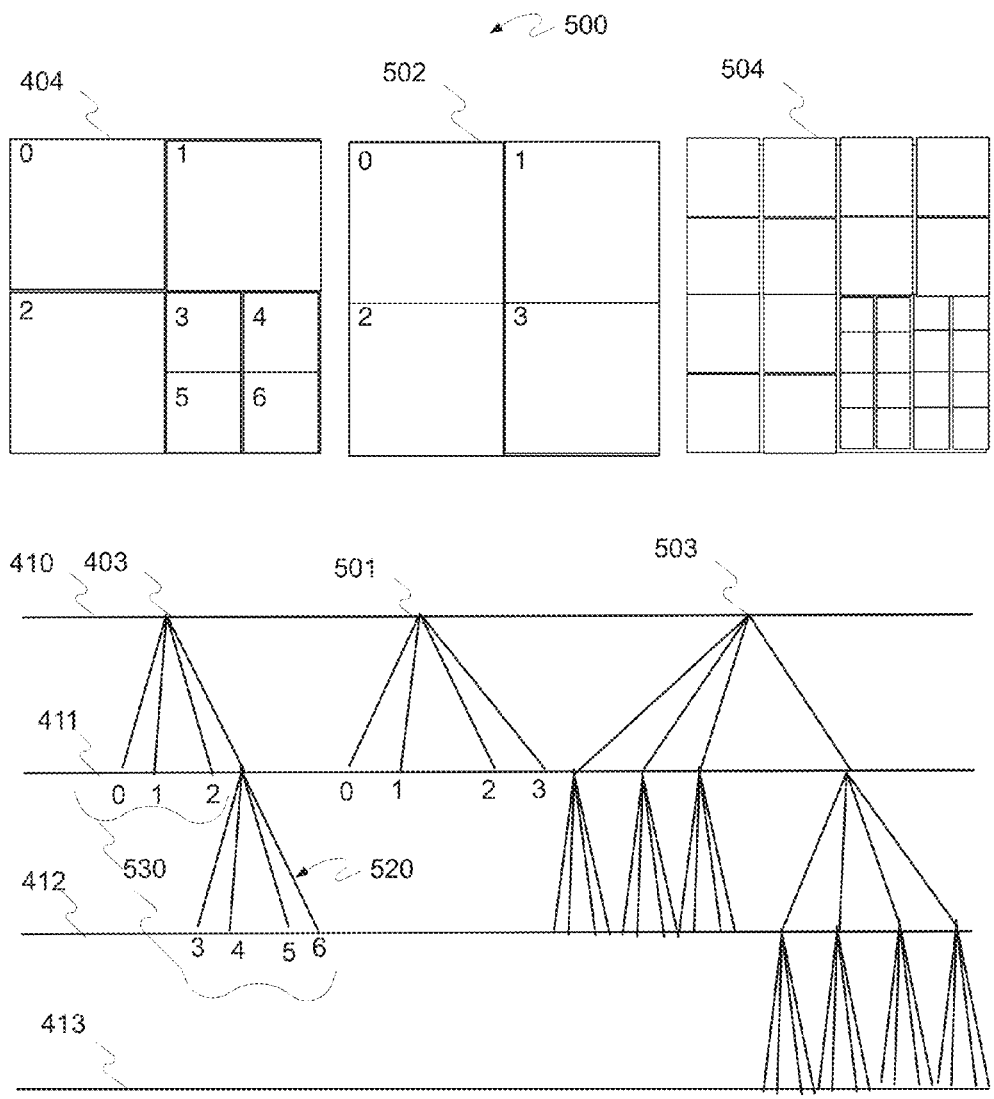
FIG. 5 is an illustrative diagram of a further example inter-layer coding unit quadtree pattern prediction scheme.

FIG. 5 is an illustrative diagram of a further example inter-layer coding unit quadtree pattern prediction scheme. In the illustrated implementation 500, quadtree pattern depth adjustment may be performed on the projected reference quadtree pattern 404 to form a depth adjusted projected reference quadtree pattern 501 (e.g. as illustrated by coding unit 502) and/or depth adjusted projected reference quadtree pattern 503 (e.g. as illustrated by coding unit 504). In some examples, such depth adjustment may include adjusting a splitting pattern for all leaf nodes associated with the projected reference quadtree pattern 403 based at least in part on a depth change parameter.

In the example illustrated by depth adjusted projected reference quadtree pattern 501, such depth adjustment may include merging all leaf nodes 520 associated with the projected reference quadtree pattern 403 into a previous depth level (e.g., primary depth level 411) from a current depth level (e.g., secondary depth level 412) when the depth change parameter indicates a coarser resolution.

Additionally or alternatively, In the example illustrated by depth adjusted projected reference quadtree pattern 503, such depth adjustment may include splitting all leaf nodes 530 associated with the projected reference quadtree pattern 403 into a next depth level (e.g., into secondary depth level 412 from primary depth level 411 and/or into tertiary depth level 413 from secondary depth level 412) when the depth change parameter indicates a finer resolution. As will be described in greater detail below, a coding unit pattern may be modified by using delta_depth values of −1 and 1, where, in general, a delta_depth larger than 0 may make the coding unit pattern to be finer while a delta_depth less than 0 may make the coding unit pattern to be coarser, for example.

As processed in HEVC, each LCU may be recursively split into smaller CUs by using quadtree-based scheme. A variable called depth may be used to indicate the splitting level, which is also related to the coding unit sizes. Assuming the LCU size is 2N×2N, and the corresponding initial depth is equal to 0. If the LCU is split into four N×N CUs, the depth increases by 1. The recursive quadtree splitting is terminated by the variable max depth, which comes from SPS. On the other hand, different layers in SVC may correspond to different spatial resolutions of the same video content. Take dyadic spatial scalability as an example, it is characterized by a doubling of the picture width and height from one layer to the next. As a result, scaling is needed to project lower layer's coding unit pattern onto higher layer.

To be specific, the rule of coding unit quadtree pattern projection to a target layer (e.g., an enhancement layer) is depicted by the equation 1 where the depths of target layer (e.g., an enhancement layer) coding unit and co-located reference layer (e.g., a base layer or a lower level enhancement layer) coding unit are indicated by $depth_{EL}$ and $depth_{RL}$, respectively.

$$depth_{EL} = depth_{RL} - \log_2 S \quad (1)$$

The scaling factor S may refer to a dimension ratio between a target layer picture and a reference layer picture. For the dyadic case, S is equal to 2. FIG. 4 shows an example of coding unit quadtree pattern projection, when two layered dyadic spatial SVC is used.

After the co-located coding unit pattern is projected to an enhancement layer, the parameter delta_depth may be used to modify current coding unit quadtree pattern. The usage of delta_depth value is as follows:

$$depth'_{EL} = \text{clip}(0, \max\_depth, depth_{EL} + delta\_depth) \quad (2)$$

In cases where delta_depth is equal to 0, the delta_depth specifies that the current coding unit quadtree pattern will not be modified. In cases where delta_depth is larger than 0, the delta_depth specifies that all the leaf nodes in current coding unit quadtree pattern will be further split, and the recursive iteration may be equal to delta_depth. In cases where delta_depth is less than 0, the delta_depth specifies that all the leaf nodes in the current coding unit quadtree pattern may be merged, and the recursive iteration may be equal to delta_depth.

In some examples, a mechanism may be used to apply Quantization Parameter (QP)-based adaptive parameters for inter-layer coding unit pattern prediction. For example, the delta depth parameter may be adaptively decided by the QP value.

Figure 6:
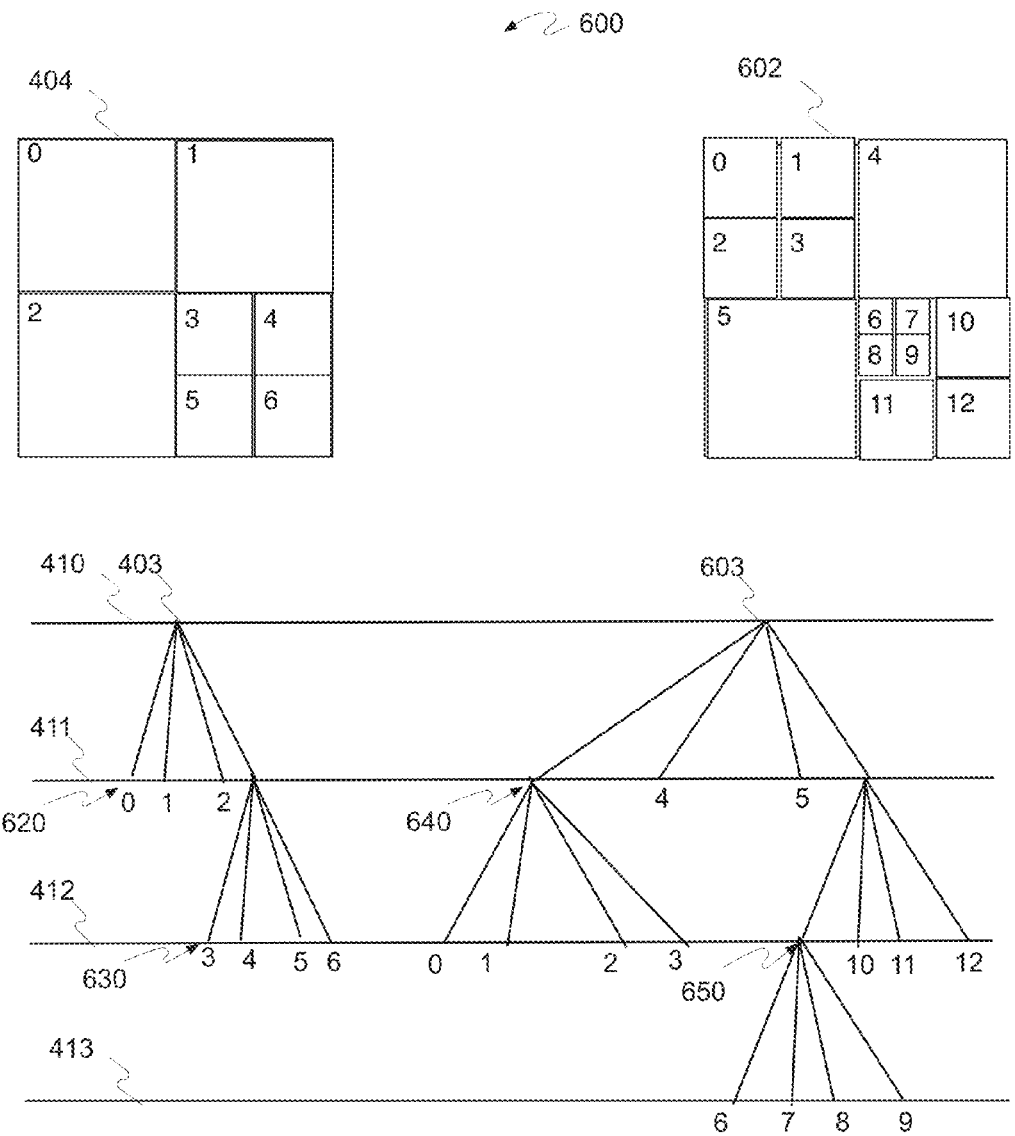
FIG. 6 is an illustrative diagram of a still further example inter-layer coding unit quadtree pattern prediction scheme.

FIG. 6 is an illustrative diagram of a still further example inter-layer coding unit quadtree pattern prediction scheme. In the illustrated implementation 600, quadtree leaf node adjustment may be performed in addition or in the alternative to the quadtree pattern depth adjustment. Such quadtree leaf node adjustment may be performed on the projected reference quadtree pattern 403 to form a leaf node adjusted projected reference quadtree pattern 603 (e.g. as illustrated by coding unit 602).

In some examples, such leaf node adjustment may include adjusting a splitting pattern for individual leaf nodes 620 and/or 630 associated with the projected reference quadtree pattern 403 on a leaf node-by-leaf node basis based at least in part on individual leaf node split flags associated with individual leaf nodes. For example, such leaf node adjustment may include merging individual leaf nodes associated with the projected reference quadtree pattern into a previous depth level when the individual leaf node split flags indicates a coarser resolution, and/or splitting individual leaf nodes associated with the projected reference quadtree pattern into a next depth level when the individual leaf node split flags indicates a finer resolution (as illustrated at split leaf nodes 640 and 650).

In some examples, such leaf nodes updating may be turned on/off by a leaf node updating flag. When the updating is used, a group of leaf node splitting flag may be signaled to specify if each leaf nodes will be further split once. In the illustrated example, there are seven CUs in the LCU before the leaf nodes updating, so the number of leaf node splitting flags is 7. The leaf nodes marked by at numerals 620 and 630 are to be further split and their depth levels are increased by 1, because their corresponding leaf node splitting flag is equal to 1. For the leaf nodes with splitting flag equal to −1, their depth level may be decreased by 1, which indicates a coarser coding unit pattern.

In some examples, a mechanism may be used to apply encoder-generated adaptive parameter for inter-layer coding unit pattern prediction. For example, the delta depth parameter and leaf node split flags may be generated at the encode side by using characters of current picture and/or previously encoded pictures, and then coded and transmitted to decoder. Alternatively, a mechanism may be used to apply self-generated adaptive parameters for inter-layer coding unit pattern prediction. For example, the delta depth parameter and leaf node split flags may be self-generated at the decoder side, by using the characters of previously coded neighboring pixels.

Figure 7:
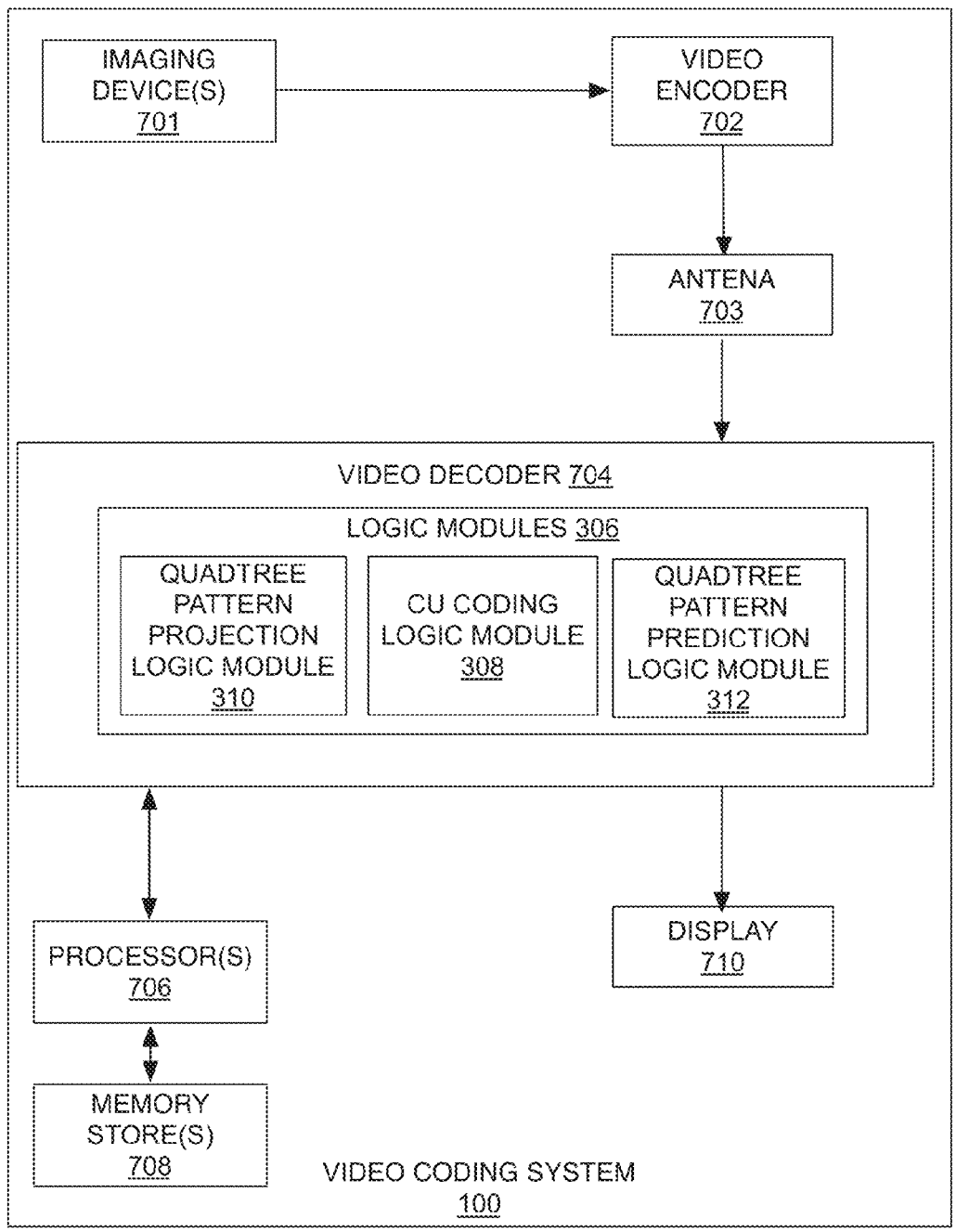
FIG. 7 is an illustrative diagram of an example video coding system.

FIG. 7 is an illustrative diagram of an example video coding system 100, arranged in accordance with at least some implementations of the present disclosure. In the illustrated implementation, video coding system 100 may include imaging device(s) 701, a video encoder 702, an antenna 703, a video decoder 704, one or more processors 706, one or more memory stores 708, a display 710, and/or logic modules 306. Logic modules 306 may include quadtree pattern projection logic module 310, quadtree pattern prediction logic module 312, the like, and/or combinations thereof.

As illustrated, antenna 703, video decoder 704, processor 706, memory store 708, and/or display 710 may be capable of communication with one another and/or communication with portions of logic modules 306. Similarly, imaging device(s) 701 and video encoder 702 may be capable of communication with one another and/or communication with portions of logic modules 306. Accordingly, video decoder 704 may include all or portions of logic modules 306, while video encoder 702 may include similar logic modules. Although video coding system 100, as shown in FIG. 7, may include one particular set of blocks or actions associated with particular modules, these blocks or actions may be associated with different modules than the particular module illustrated here.

In some examples, video coding system 100 may include antenna 703, video decoder 704, the like, and/or combinations thereof. Antenna 703 may be configured to receive an encoded bitstream of video data. Video decoder 704 may be communicatively coupled to antenna 703 and may be configured to decode the encoded bitstream. The video decoder may be configured to project a reference quadtree pattern associated with a portion of a reference coding unit from a reference layer to a target coding unit in a target layer based at least in part on the resolution of the target coding unit, determine a target quadtree pattern associated with the target coding unit by performing an inter-layer quadtree pattern prediction based at least in part on the projected reference quadtree pattern, and/or code the target coding unit based at least in part on the determined target quadtree pattern.

In other examples, video coding system 100 may include display device 710, one or more processors 706, one or more memory stores 708, quadtree pattern projection logic module 310, quadtree pattern prediction logic module 312, the like, and/or combinations thereof. Display 710 may be configured to present video data. Processors 706 may be communicatively coupled to display 710. Memory stores 708 may be communicatively coupled to the one or more processors 706. Quadtree pattern projection logic module 310 of video decoder 704 (or video encoder 702 in other examples) may be communicatively coupled to the one or more processors 706 and may be configured to project a reference quadtree pattern associated with a portion of a reference coding unit from a reference layer to a target coding unit in a target layer based at least in part on the resolution of the target coding unit. Quadtree pattern prediction logic module 312 of video decoder 704 (or video encoder 702 in other examples) may be communicatively coupled to quadtree pattern projection logic module 310 and may be configured to determine a target quadtree pattern associated with the target coding unit by performing an inter-layer quadtree pattern prediction based at least in part on the projected reference quadtree pattern.

In various embodiments, quadtree pattern projection logic module 310 and/or quadtree pattern prediction logic module 312 may be implemented in hardware, while software may implement other logic modules. For example, in some embodiments, quadtree pattern projection logic module 310 may be implemented by application-specific integrated circuit (ASIC) logic while quadtree pattern prediction logic module 312 may be provided by software instructions executed by logic such as processors 706. However, the present disclosure is not limited in this regard and quadtree pattern projection logic module 310 and/or quadtree pattern prediction logic module 312 may be implemented by any combination of hardware, firmware and/or software. In addition, memory stores 708 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 708 may be implemented by cache memory.

Figure 8:
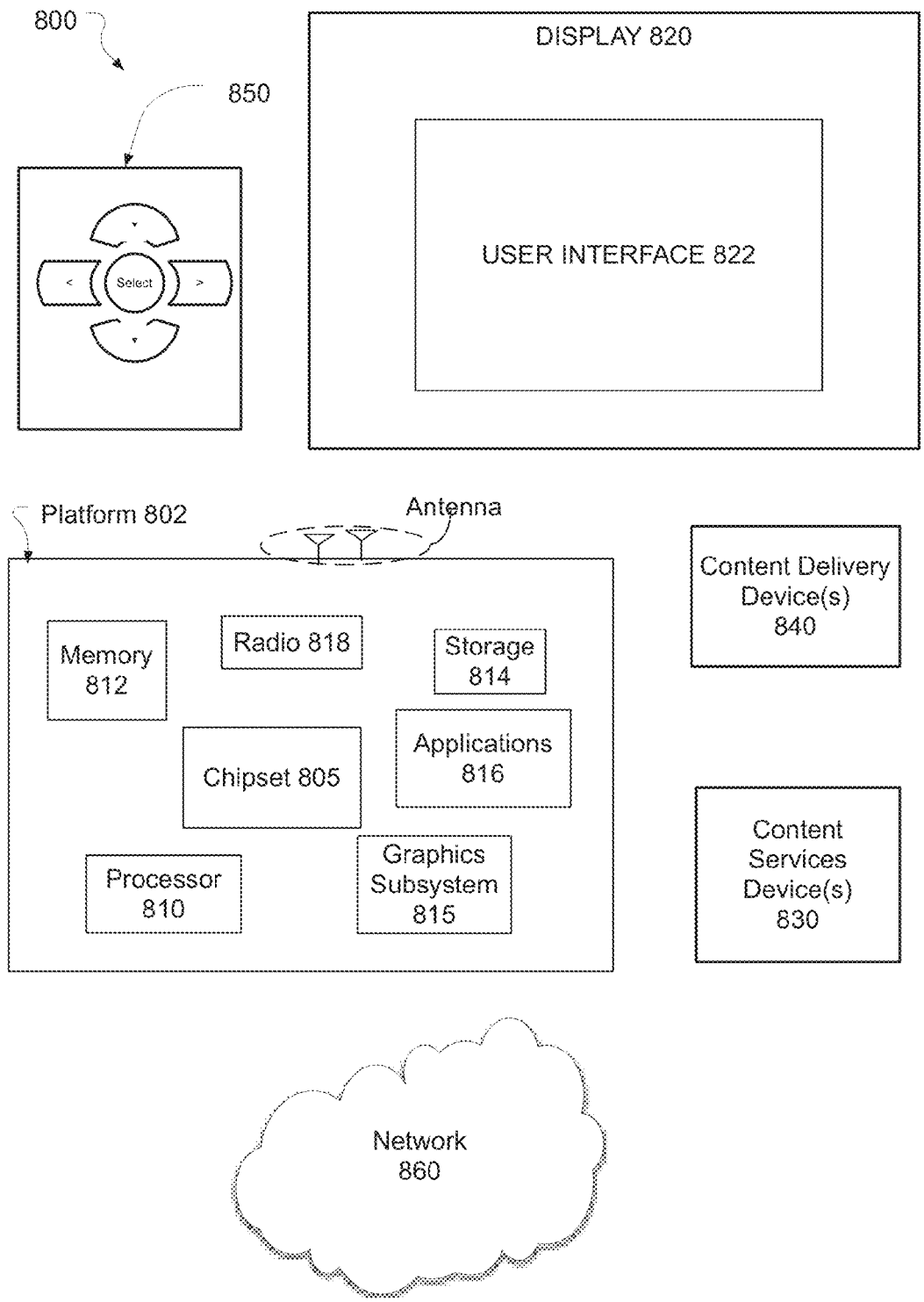
FIG. 8 is an illustrative diagram of an example system.

FIG. 8 illustrates an example system 800 in accordance with the present disclosure. In various implementations, system 800 may be a media system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 800 includes a platform 802 coupled to a display 820. Platform 802 may receive content from a content device such as content services device(s) 830 or content delivery device(s) 840 or other similar content sources. A navigation controller 850 including one or more navigation features may be used to interact with, for example, platform 802 and/or display 820. Each of these components is described in greater detail below.

In various implementations, platform 802 may include any combination of a chipset 805, processor 810, memory 812, storage 814, graphics subsystem 815, applications 816 and/or radio 818. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 810 may be dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 814 may include technology to increase the storage performance enhanced protection for valuable digital media when multiple hard drives are included, for example.

Graphics subsystem 815 may perform processing of images such as still or video for display. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, Display Port, wireless HDMI, and/or wireless HD compliant techniques. Graphics subsystem 815 may be integrated into processor 810 or chipset 805. In some implementations, graphics subsystem 815 may be a stand-alone card communicatively coupled to chipset 805.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 820 may include any television type monitor or display. Display 820 may include, for example, a computer display screen, touch screen display, video monitor, television-like device, and/or a television. Display 820 may be digital and/or analog. In various implementations, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In various implementations, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In various implementations, content services device(s) 830 may include a cable television box, personal computer, network, telephone, Internet enabled devices or appliance capable of delivering digital information and/or content, and any other similar device capable of unidirectionally or bidirectionally communicating content between content providers and platform 802 and/display 820, via network 860 or directly. It will be appreciated that the content may be communicated unidirectionally and/or bidirectionally to and from any one of the components in system 800 and a content provider via network 860. Examples of content may include any media information including, for example, video, music, medical and gaming information, and so forth.

Content services device(s) 830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 802 may receive control signals from navigation controller 850 having one or more navigation features. The navigation features of controller 850 may be used to interact with user interface 822, for example. In embodiments, navigation controller 850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 850 may be replicated on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In embodiments, controller 850 may not be a separate component but may be integrated into platform 802 and/or display 820. The present disclosure, however, is not limited to the elements or in the context shown or described herein.

In various implementations, drivers (not shown) may include technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 even when the platform is turned "off." In addition, chipset 805 may include hardware and/or software support for 8.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the present disclosure.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
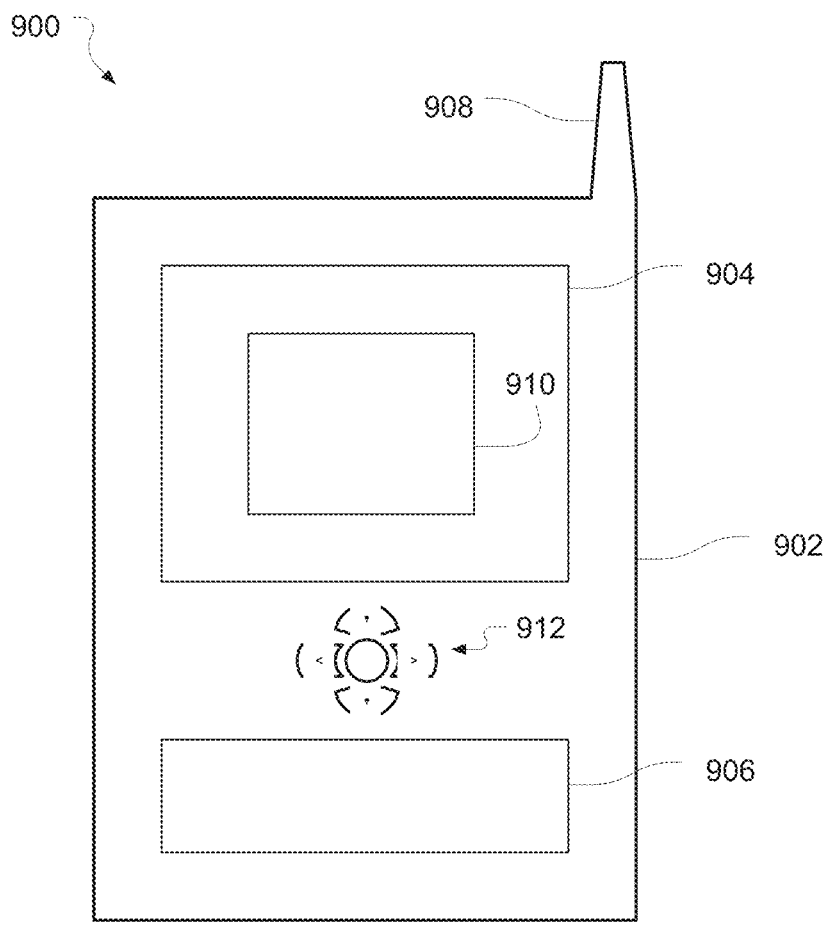
FIG. 9 is an illustrative diagram of an example system, all arranged in accordance with at least some implementations of the present disclosure.

As described above, system 800 may be embodied in varying physical styles or form factors. FIG. 9 illustrates implementations of a small form factor device 900 in which system 800 may be embodied. In embodiments, for example, device 900 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g. smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may include a housing 902, a display 904, an input/output (I/O) device 906, and an antenna 908. Device 900 also may include navigation features 912. Display 904 may include any suitable display unit for displaying information appropriate for a mobile computing device. I/O device 906 may include any suitable I/O device for entering information into a mobile computing device. Examples for I/O device 906 may include an alphanumeric keyboard, a numeric keypad, a touch pad, input keys, buttons, switches, rocker switches, microphones, speakers, voice recognition device and software, and so forth. Information also may be entered into device 900 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for video coding may include projecting a reference quadtree pattern associated with a portion of a reference coding unit from a reference layer to a target coding unit in a target layer based at least in part on the resolution of the target coding unit. A target quadtree pattern associated with the target coding unit may be determined by performing an inter-layer quadtree pattern prediction based at least in part on the projected reference quadtree pattern. The target coding unit may be coded based at least in part on the determined target quadtree pattern.

In another example, the computer-implemented method for video coding may include performing quadtree pattern depth adjustment on the projected reference quadtree pattern to form a depth adjusted projected reference quadtree pattern. Such depth adjustment may include adjusting a splitting pattern for all leaf nodes associated with the projected reference quadtree pattern based at least in part on a depth change parameter. For example, such depth adjustment may include merging all leaf nodes associated with the projected reference quadtree pattern into a previous depth level when the depth change parameter indicates a coarser resolution, and/or splitting all leaf nodes associated with the projected reference quadtree pattern into a next depth level when the depth change parameter indicates a finer resolution. Quadtree leaf node adjustment may be performed in addition or in the alternative to the quadtree pattern depth adjustment. Such quadtree leaf node adjustment may be performed on the projected reference quadtree pattern to form a leaf node adjusted projected reference quadtree pattern. Such leaf node adjustment may include adjusting a splitting pattern for individual leaf nodes associated with the projected reference quadtree pattern on a leaf node-by-leaf node basis based at least in part on individual leaf node split flags associated with individual leaf nodes. For example, such leaf node adjustment may include merging individual leaf nodes associated with the projected reference quadtree pattern into a previous depth level when the individual leaf node split flags indicates a coarser resolution, and/or splitting individual leaf nodes associated with the projected reference quadtree pattern into a next depth level when the individual leaf node split flags indicates a finer resolution. A differentiation may be made between a first type of coding unit and a second type of coding unit different from the first type, where the first and second type of coding units differ base on one or more of the following criteria: a slice-level criterion, a picture level criterion, a view level criterion, the like, and/or combinations thereof. Inter-layer quadtree pattern prediction may be selectively performed with a first parameter value for the first type of coding unit and with a second parameter value different from the first parameter value for the second type of coding unit. A decoder portion of the coder may receive parameter values from an encoder portion of the coder or may determine parameter values independent from and in parallel with an encoder portion of the coder, where the parameter values may be associated with performing quadtree pattern depth adjustment, performing quadtree leaf node adjustment and/or performing inner coding parameter prediction. In cases where the reference layer includes a base layer, the target layer may include an enhancement layer, alternatively, in cases where the reference layer includes an enhancement layer, the target layer may include a higher enhancement layer. The determination of the target quadtree pattern may be performed during scalable video coding for one or more scalability types including spatial scaling, temporal scaling, quality scaling, bit-depth scaling the like, and/or combinations thereof.

In other examples, a system for video coding on a computer may include a display device, one or more processors, one or more memory stores, a quadtree pattern projection logic module, a quadtree pattern prediction logic module, a coder, the like, and/or combinations thereof. The display device may be configured to present video data. The one or more processors may be communicatively coupled to the display device. The one or more memory stores may be communicatively coupled to the one or more processors. The quadtree pattern projection logic module may be communicatively coupled to the one or more processors and may be configured to project a reference quadtree pattern associated with a portion of a reference coding unit from a reference layer to a target coding unit in a target layer based at least in part on the resolution of the target coding unit. The quadtree pattern prediction logic module may be communicatively coupled to the quadtree pattern projection logic module and may be configured to determine a target quadtree pattern associated with the target coding unit by performing an inter-layer quadtree pattern prediction based at least in part on the projected reference quadtree pattern. The coder may be communicatively coupled to the quadtree pattern prediction logic module and may be configured to code the target coding unit based at least in part on the determined target quadtree pattern.

In another example, the quadtree pattern prediction logic module may be further configured to perform quadtree pattern depth adjustment on the projected reference quadtree pattern to form a depth adjusted projected reference quadtree pattern. Such depth adjustment may include adjusting a splitting pattern for all leaf nodes associated with the projected reference quadtree pattern based at least in part on a depth change parameter. For example, such depth adjustment may include a merger of all leaf nodes associated with the projected reference quadtree pattern into a previous depth level when the depth change parameter indicates a coarser resolution, and a split of all leaf nodes associated with the projected reference quadtree pattern into a next depth level when the depth change parameter indicates a finer resolution. A quadtree leaf node adjustment may be performed in addition to or in the alternative to the quadtree pattern depth adjustment. Such a quadtree leaf node adjustment may be performed on the projected reference quadtree pattern to form a leaf node adjusted projected reference quadtree pattern, where the leaf node adjustment may include adjusting a splitting pattern for individual leaf nodes associated with the projected reference quadtree pattern on a leaf node-by-leaf node basis based at least in part on individual leaf node split flags associated with individual leaf nodes. For example, such a leaf node adjustment may include a merger of individual leaf nodes associated with the projected reference quadtree pattern into a previous depth level when the individual leaf node split flags indicates a coarser resolution, and/or a split of individual leaf nodes associated with the projected reference quadtree pattern into a next depth level when the individual leaf node split flags indicates a finer resolution. A differentiation may be made between a first type of coding unit and a second type of coding unit different from the first type, where the first and second type of coding units differ base on one or more of the following criteria: a slice-level criterion, a picture level criterion, a view level criterion, the like, and/or combinations thereof. Inter-layer quadtree pattern prediction may be selectively performed with a first parameter value for the first type of coding unit and with a second parameter value different from the first parameter value for the second type of coding unit. Encoded parameter values may be received or may be determined independent from and in parallel with an encoder, where the parameter values are associated with performing quadtree pattern depth adjustment, performing quadtree leaf node adjustment and/or performing inner coding parameter prediction. In cases where the reference layer includes a base layer, the target layer may include an enhancement layer, and in cases where the reference layer includes an enhancement layer, the target layer may include a higher enhancement layer. The determination of the target quadtree pattern may be performed during scalable video coding for one or more scalability types including spatial scaling, temporal scaling, quality scaling, bit-depth scaling, the like, and/or combinations thereof.

In other examples, a system may include an antenna, a video decoder, the like, and/or combinations thereof. The antenna may be configured to receive an encoded bitstream of video data. The video decoder may be communicatively coupled to the antenna and may be configured to decode the encoded bitstream. The video decoder may be configured to project a reference quadtree pattern associated with a portion of a reference coding unit from a reference layer to a target coding unit in a target layer based at least in part on the resolution of the target coding unit, determine a target quadtree pattern associated with the target coding unit by performing an inter-layer quadtree pattern prediction based at least in part on the projected reference quadtree pattern, and/or code the target coding unit based at least in part on the determined target quadtree pattern.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for video coding, comprising:
   projecting a reference quadtree pattern associated with a portion of a reference coding unit from a scalable video coding-type reference layer to a target coding unit in a scalable video coding-type target layer based at least in part on the resolution of the target coding unit;
   determining a target quadtree pattern associated with the target coding unit by performing an inter-layer quadtree pattern prediction between the reference layer and the target layer based at least in part on the projected reference quadtree pattern, wherein the inter-layer quadtree pattern prediction further comprises performing quadtree leaf node adjustment on the projected reference quadtree pattern to form a leaf node adjusted projected reference quadtree pattern, wherein the leaf node adjustment comprises adjusting a splitting pattern for individual leaf nodes associated with the projected reference quadtree pattern on a leaf node-by-leaf node basis based at least in part on individual leaf node split flags associated with individual leaf nodes; and
   coding the target coding unit based at least in part on the determined target quadtree pattern.

2. The method of claim 1, wherein the projection of the reference quadtree pattern further comprises:
   projecting a reference coding unit quadtree pattern associated with the portion of the reference coding unit from the reference layer to the target coding unit in the target layer based at least in part on the resolution of the target coding unit, wherein the projection of the reference coding unit quadtree pattern comprises at least one of the following procedures:
      projecting a reference coding unit splitting pattern associated with the portion of the reference coding unit from the reference layer to the target coding unit in the target layer,
      projecting a reference coding unit and prediction unit combined splitting pattern associated with the portion of the reference coding unit from the reference layer to the target coding unit in a target layer,
      projecting a reference coding unit and transform unit combined splitting pattern associated with the portion of a reference coding unit from the reference layer to the target coding unit in a target layer, and
      projecting a reference coding unit, prediction unit and transform unit combined splitting pattern associated with the portion of a reference coding unit from the reference layer to the target coding unit in a target layer.

3. The method of claim 1, wherein the inter-layer quadtree pattern prediction further comprises:
   performing quadtree pattern depth adjustment on the projected reference quadtree pattern to form a depth adjusted projected reference quadtree pattern.

4. The method of claim 1, wherein the inter-layer quadtree pattern prediction further comprises:
   performing quadtree pattern depth adjustment on the projected reference quadtree pattern to form a depth adjusted projected reference quadtree pattern, wherein the depth adjustment comprises adjusting a splitting pattern for all leaf nodes associated with the projected reference quadtree pattern based at least in part on a depth change parameter.

5. The method of claim 1, wherein the inter-layer quadtree pattern prediction further comprises:
performing quadtree pattern depth adjustment on the projected reference quadtree pattern to form a depth adjusted projected reference quadtree pattern, wherein the depth adjustment comprises adjusting a splitting pattern for all leaf nodes associated with the projected reference quadtree pattern based at least in part on a depth change parameter, wherein the depth adjustment comprises:
merging all leaf nodes associated with the projected reference quadtree pattern into a previous depth level when the depth change parameter indicates a coarser resolution, and
splitting all leaf nodes associated with the projected reference quadtree pattern into a next depth level when the depth change parameter indicates a finer resolution.

6. The method of claim 1, wherein the inter-layer quadtree pattern prediction further comprises:
performing quadtree leaf node adjustment on the projected reference quadtree pattern to form a leaf node adjusted projected reference quadtree pattern, wherein the leaf node adjustment comprises adjusting a splitting pattern for individual leaf nodes associated with the projected reference quadtree pattern on a leaf node-by-leaf node basis.

7. The method of claim 1, wherein the inter-layer quadtree pattern prediction further comprises:
wherein the leaf node adjustment comprises:
merging individual leaf nodes associated with the projected reference quadtree pattern into a previous depth level when the individual leaf node split flags indicates a coarser resolution, and
splitting individual leaf nodes associated with the projected reference quadtree pattern into a next depth level when the individual leaf node split flags indicates a finer resolution.

8. The method of claim 1, wherein the inter-layer quadtree pattern prediction further comprises:
performing inner coding parameter prediction on the projected target coding unit to predict coding parameters from the reference coding unit to the target coding unit.

9. The method of claim 1, wherein the inter-layer quadtree pattern prediction further comprises:
performing inner coding parameter prediction on the projected reference coding unit to predict coding parameters from the reference coding unit to the target coding unit, wherein the coding parameter prediction comprises at least one of the following procedures:
reusing a prediction unit mode of the reference coding unit to code the target coding unit,
reusing motion parameters of the reference coding unit to code the target coding unit, and
reusing a transform unit splitting pattern of the reference coding unit to code the target coding unit.

10. The method of claim 1, wherein the inter-layer quadtree pattern prediction further comprises:
performing quadtree pattern depth adjustment on the projected reference quadtree pattern to form a depth adjusted projected reference quadtree pattern, wherein the depth adjustment comprises adjusting a splitting pattern for all leaf nodes associated with the projected reference quadtree pattern based at least in part on a depth change parameter, wherein the depth adjustment comprises:
merging all leaf nodes associated with the projected reference quadtree pattern into a previous depth level when the depth change parameter indicates a coarser resolution, and
splitting all leaf nodes associated with the projected reference quadtree pattern into a next depth level when the depth change parameter indicates a finer resolution;
wherein the leaf node adjustment comprises:
merging individual leaf nodes associated with the projected reference quadtree pattern into a previous depth level when the individual leaf node split flags indicates a coarser resolution, and
splitting individual leaf nodes associated with the projected reference quadtree pattern into a next depth level when the individual leaf node split flags indicates a finer resolution; and
performing inner coding parameter prediction on the projected reference coding unit to predict coding parameters from the reference coding unit to the target coding unit, wherein the coding parameter prediction comprises at least one of the following procedures:
reusing a prediction unit mode of the reference coding unit to code the target coding unit,
reusing motion parameters of the reference coding unit to code the target coding unit, and
reusing a transform unit splitting pattern of the reference coding unit to code the target coding unit.

11. The method of claim 1, further comprising:
performing quadtree pattern depth adjustment on the projected reference quadtree pattern to form a depth adjusted projected reference quadtree pattern, wherein the depth adjustment comprises adjusting a splitting pattern for all leaf nodes associated with the projected reference quadtree pattern based at least in part on a depth change parameter, wherein the depth adjustment comprises:
merging all leaf nodes associated with the projected reference quadtree pattern into a previous depth level when the depth change parameter indicates a coarser resolution, and
splitting all leaf nodes associated with the projected reference quadtree pattern into a next depth level when the depth change parameter indicates a finer resolution;
wherein the leaf node adjustment comprises:
merging individual leaf nodes associated with the projected reference quadtree pattern into a previous depth level when the individual leaf node split flags indicates a coarser resolution, and
splitting individual leaf nodes associated with the projected reference quadtree pattern into a next depth level when the individual leaf node split flags indicates a finer resolution;
performing inner coding parameter prediction on the projected reference coding unit to predict coding parameters from the reference coding unit to the target coding unit, wherein the coding parameter prediction comprises at least one of the following procedures:
reusing a prediction unit mode of the reference coding unit to code the target coding unit,
reusing motion parameters of the reference coding unit to code the target coding unit, and
reusing a transform unit splitting pattern of the reference coding unit to code the target coding unit;
differentiating between a first type of coding unit and a second type of coding unit different from the first type, wherein the first and second type of coding units differ base on one or more of the following criteria: a slice-level criterion, a picture level criterion, and a view level criterion; and selectively performing inter-layer quadtree pattern prediction with a first parameter value for the first type of coding unit and with a second parameter value different from the first parameter value for the second type of coding unit; and receiving, via a decoder portion of the coder, parameter values from an encoder portion of the coder or determining, via a decoder portion of the coder, parameter values independent from and in parallel with an encoder portion of the coder, wherein the parameter values are associated with performing quadtree pattern depth adjustment, performing quadtree leaf node adjustment and/or performing inner coding parameter prediction, wherein when the reference layer comprises a base layer, the target layer comprises an enhancement layer; and wherein when the reference layer comprises an enhancement layer, the target layer comprises a higher enhancement layer, wherein the determination of the target quadtree pattern is performed during scalable video coding for one or more scalability types including spatial scaling, temporal scaling, quality scaling, and bit-depth scaling.

12. A system for video coding on a computer, comprising:
a display device configured to present video data;
one or more processors communicatively coupled to the display device;
one or more memory stores communicatively coupled to the one or more processors;
a quadtree pattern projection logic module communicatively coupled to the one or more processors and configured to project a reference quadtree pattern associated with a portion of a reference coding unit from a scalable video coding-type reference layer to a target coding unit in a scalable video coding-type target layer based at least in part on the resolution of the target coding unit;
a quadtree pattern prediction logic module communicatively coupled to the quadtree pattern projection logic module and configured to determine a target quadtree pattern associated with the target coding unit by performing an inter-layer quadtree pattern prediction between the reference layer and the target layer based at least in part on the projected reference quadtree pattern, and perform quadtree leaf node adjustment on the projected reference quadtree pattern to form a leaf node adjusted projected reference quadtree pattern, wherein the leaf node adjustment comprises adjusting a splitting pattern for individual leaf nodes associated with the projected reference quadtree pattern on a leaf node-by-leaf node basis based at least in part on individual leaf node split flags associated with individual leaf nodes; and
a coder communicatively coupled to the quadtree pattern prediction logic module and configured to code the target coding unit based at least in part on the determined target quadtree pattern.

13. The system of claim 12, wherein the quadtree pattern prediction logic module is further configured to:
perform quadtree pattern depth adjustment on the projected reference quadtree pattern to form a depth adjusted projected reference quadtree pattern, wherein the depth adjustment comprises adjusting a splitting pattern for all leaf nodes associated with the projected reference quadtree pattern based at least in part on a depth change parameter, wherein the depth adjustment comprises:
merge all leaf nodes associated with the projected reference quadtree pattern into a previous depth level when the depth change parameter indicates a coarser resolution, and
split all leaf nodes associated with the projected reference quadtree pattern into a next depth level when the depth change parameter indicates a finer resolution.

14. The system of claim 12, wherein the quadtree pattern prediction logic module is further configured to:
perform quadtree leaf node adjustment, wherein the leaf node adjustment comprises:
merge individual leaf nodes associated with the projected reference quadtree pattern into a previous depth level when the individual leaf node split flags indicates a coarser resolution, and
split individual leaf nodes associated with the projected reference quadtree pattern into a next depth level when the individual leaf node split flags indicates a finer resolution.

15. The system of claim 12, wherein the quadtree pattern prediction logic module is further configured to:
perform inner coding parameter prediction on the projected reference coding unit to predict coding parameters from the reference coding unit to the target coding unit, wherein the coding parameter prediction comprises at least one of the following procedures:
reuse a prediction unit mode of the reference coding unit to code the target coding unit,
reuse motion parameters of the reference coding unit to code the target coding unit, and
reuse a transform unit splitting pattern of the reference coding unit to code the target coding unit.

16. The system of claim 12, wherein when the reference layer comprises a base layer, the target layer comprises an enhancement layer; and wherein when the reference layer comprises an enhancement layer, the target layer comprises a higher enhancement layer.

17. The system of claim 12, wherein the determination of the target quadtree pattern is performed during scalable video coding for one or more scalability types including spatial scaling, temporal scaling, quality scaling, and bit-depth scaling.

18. The system of claim 12, wherein the quadtree pattern prediction logic module is further configured to:
differentiate between a first type of coding unit and a second type of coding unit different from the first type, wherein the first and second type of coding units differ base on one or more of the following criteria: a slice-level criterion, a picture level criterion, and a view level criterion; and
selectively perform inter-layer quadtree pattern prediction with a first parameter value for the first type of coding unit and with a second parameter value different from the first parameter value for the second type of coding unit.

19. The system of claim 12, wherein the quadtree pattern prediction logic module is further configured to:
receive encoded parameter values, wherein the parameter values are associated with performing quadtree pattern depth adjustment, performing quadtree leaf node adjustment and/or performing inner coding parameter prediction.

20. The system of claim 12, wherein the quadtree pattern prediction logic module is further configured to:
perform quadtree pattern depth adjustment on the projected reference quadtree pattern to form a depth adjusted projected reference quadtree pattern, wherein the depth adjustment comprises adjusting a splitting pattern for all leaf nodes associated with the projected reference quadtree pattern based at least in part on a depth change parameter, wherein the depth adjustment comprises:
merge all leaf nodes associated with the projected reference quadtree pattern into a previous depth level when the depth change parameter indicates a coarser resolution, and
split all leaf nodes associated with the projected reference quadtree pattern into a next depth level when the depth change parameter indicates a finer resolution;
wherein the leaf node adjustment comprises:
merge individual leaf nodes associated with the projected reference quadtree pattern into a previous depth level when the individual leaf node split flags indicates a coarser resolution, and
split individual leaf nodes associated with the projected reference quadtree pattern into a next depth level when the individual leaf node split flags indicates a finer resolution;
perform inner coding parameter prediction on the projected reference coding unit to predict coding parameters from the reference coding unit to the target coding unit, wherein the coding parameter prediction comprises at least one of the following procedures:
reuse a prediction unit mode of the reference coding unit to code the target coding unit,
reuse motion parameters of the reference coding unit to code the target coding unit,
reuse a transform unit splitting pattern of the reference coding unit to code the target coding unit;
differentiate between a first type of coding unit and a second type of coding unit different from the first type, wherein the first and second type of coding units differ base on one or more of the following criteria: a slice-level criterion, a picture level criterion, and a view level criterion; and
selectively perform inter-layer quadtree pattern prediction with a first parameter value for the first type of coding unit and with a second parameter value different from the first parameter value for the second type of coding unit; and
receive encoded parameter values or determine parameter values independent from and in parallel with an encoder, wherein the parameter values are associated with performing quadtree pattern depth adjustment, performing quadtree leaf node adjustment and/or performing inner coding parameter prediction,
wherein when the reference layer comprises a base layer, the target layer comprises an enhancement layer; and wherein when the reference layer comprises an enhancement layer, the target layer comprises a higher enhancement layer,
wherein the determination of the target quadtree pattern is performed during scalable video coding for one or more scalability types including spatial scaling, temporal scaling, quality scaling, and bit-depth scaling.

21. A system comprising:
an antenna configured to receive an encoded bitstream of video data; and
a video decoder communicatively coupled to the antenna and configured to decode the encoded bitstream, wherein the video decoder is configured to:
project a reference quadtree pattern associated with a portion of a reference coding unit from a scalable video coding-type reference layer to a target coding unit in a scalable video coding-type target layer based at least in part on the resolution of the target coding unit,
determine a target quadtree pattern associated with the target coding unit by performing an inter-layer quadtree pattern prediction between the reference layer and the target layer based at least in part on the projected reference quadtree pattern, and perform quadtree leaf node adjustment on the projected reference quadtree pattern to form a leaf node adjusted projected reference quadtree pattern, wherein the leaf node adjustment comprises adjusting a splitting pattern for individual leaf nodes associated with the projected reference quadtree pattern on a leaf node-by-leaf node basis based at least in part on individual leaf node split flags associated with individual leaf nodes, and
code the target coding unit based at least in part on the determined target quadtree pattern.

22. The system of claim 21, wherein the video decoder is further configured to:
perform quadtree pattern depth adjustment on the projected reference quadtree pattern to form a depth adjusted projected reference quadtree pattern, wherein the depth adjustment comprises adjusting a splitting pattern for all leaf nodes associated with the projected reference quadtree pattern based at least in part on a depth change parameter, wherein the depth adjustment comprises:
merge all leaf nodes associated with the projected reference quadtree pattern into a previous depth level when the depth change parameter indicates a coarser resolution, and
split all leaf nodes associated with the projected reference quadtree pattern into a next depth level when the depth change parameter indicates a finer resolution;
wherein the leaf node adjustment comprises:
merge individual leaf nodes associated with the projected reference quadtree pattern into a previous depth level when the individual leaf node split flags indicates a coarser resolution, and
split individual leaf nodes associated with the projected reference quadtree pattern into a next depth level when the individual leaf node split flags indicates a finer resolution;
perform inner coding parameter prediction on the projected reference coding unit to predict coding parameters from the reference coding unit to the target coding unit, wherein the coding parameter prediction comprises at least one of the following procedures:
reuse a prediction unit mode of the reference coding unit to code the target coding unit,
reuse motion parameters of the reference coding unit to code the target coding unit, and
reuse a transform unit splitting pattern of the reference coding unit to code the target coding unit;
differentiate between a first type of coding unit and a second type of coding unit different from the first type, wherein the first and second type of coding units differ base on one or more of the following criteria: a slice-level criterion, a picture level criterion, and a view level criterion; and selectively perform inter-layer quadtree pattern prediction with a first parameter value for the first type of coding unit and with a second parameter value different from the first parameter value for the second type of coding unit; and receive encoded parameter values or determine parameter values independent from and in parallel with an encoder, wherein the parameter values are associated with performing quadtree pattern depth adjustment, performing quadtree leaf node adjustment and/or performing inner coding parameter prediction, wherein when the reference layer comprises a base layer, the target layer comprises an enhancement layer; and wherein when the reference layer comprises an enhancement layer, the target layer comprises a higher enhancement layer, wherein the determination of the target quadtree pattern is performed during scalable video coding for one or more scalability types including spatial scaling, temporal scaling, quality scaling, and bit-depth scaling.

23. At least one non-transitory machine readable medium comprising a plurality of instructions that in response to being executed on a computing device, cause the computing device to code data by operation, comprising:

projecting a reference quadtree pattern associated with a portion of a reference coding unit from a scalable video coding-type reference layer to a target coding unit in a scalable video coding-type target layer based at least in part on the resolution of the target coding unit;

determining a target quadtree pattern associated with the target coding unit by performing an inter-layer quadtree pattern prediction between the reference layer and the target layer based at least in part on the projected reference quadtree pattern, and performing quadtree leaf node adjustment on the projected reference quadtree pattern to form a leaf node adjusted projected reference quadtree pattern, wherein the leaf node adjustment comprises adjusting a splitting pattern for individual leaf nodes associated with the projected reference quadtree pattern on a leaf node-by-leaf node wherein the leaf node adjustment comprises:

merging individual leaf nodes associated with the projected reference quadtree pattern into a previous depth level when the individual leaf node split flags indicates a coarser resolution, and splitting individual leaf nodes associated with the projected reference quadtree pattern into a next depth level when the individual leaf node split flags indicates a finer resolution;

performing inner coding parameter prediction on the projected reference coding unit to predict coding parameters from the reference coding unit to the target coding unit, wherein the coding parameter prediction comprises at least one of the following procedures:

reusing a prediction unit mode of the reference coding unit to code the target coding unit, reusing motion parameters of the reference coding unit to code the target coding unit, and reusing a transform unit splitting pattern of the reference coding unit to code the target coding unit;

differentiating between a first type of coding unit and a second type of coding unit different from the first type, wherein the first and second type of coding units differ base basis based at least in part on individual leaf node split flags associated with individual leaf nodes; and coding the target coding unit based at least in part on the determined target quadtree pattern.

24. The non-transitory machine readable medium of claim 23, further comprising instructions that in response to being executed on the computing device, cause the computing device to operate by:

performing quadtree pattern depth adjustment on the projected reference quadtree pattern to form a depth adjusted projected reference quadtree pattern, wherein the depth adjustment comprises adjusting a splitting pattern for all leaf nodes associated with the projected reference quadtree pattern based at least in part on a depth change parameter, wherein the depth adjustment comprises:

merging all leaf nodes associated with the projected reference quadtree pattern into a previous depth level when the depth change parameter indicates a coarser resolution, and splitting all leaf nodes associated with the projected reference quadtree pattern into a next depth level when the depth change parameter indicates a finer resolution;

on one or more of the following criteria: a slice-level criterion, a picture level criterion, and a view level criterion; and selectively performing inter-layer quadtree pattern prediction with a first parameter value for the first type of coding unit and with a second parameter value different from the first parameter value for the second type of coding unit; and receiving, via a decoder portion of the coder, parameter values from an encoder portion of the coder or determining, via a decoder portion of the coder, parameter values independent from and in parallel with an encoder portion of the coder, wherein the parameter values are associated with performing quadtree pattern depth adjustment, performing quadtree leaf node adjustment and/or performing inner coding parameter prediction, wherein when the reference layer comprises a base layer, the target layer comprises an enhancement layer; and wherein when the reference layer comprises an enhancement layer, the target layer comprises a higher enhancement layer, wherein the determination of the target quadtree pattern is performed during scalable video coding for one or more scalability types including spatial scaling, temporal scaling, quality scaling, and bit-depth scaling.

\* \* \* \* \*